June 12, 1956 W. J. TURNER ET AL 2,750,007
REVERSE ROTATION ARRESTOR
Filed Oct. 9, 1952
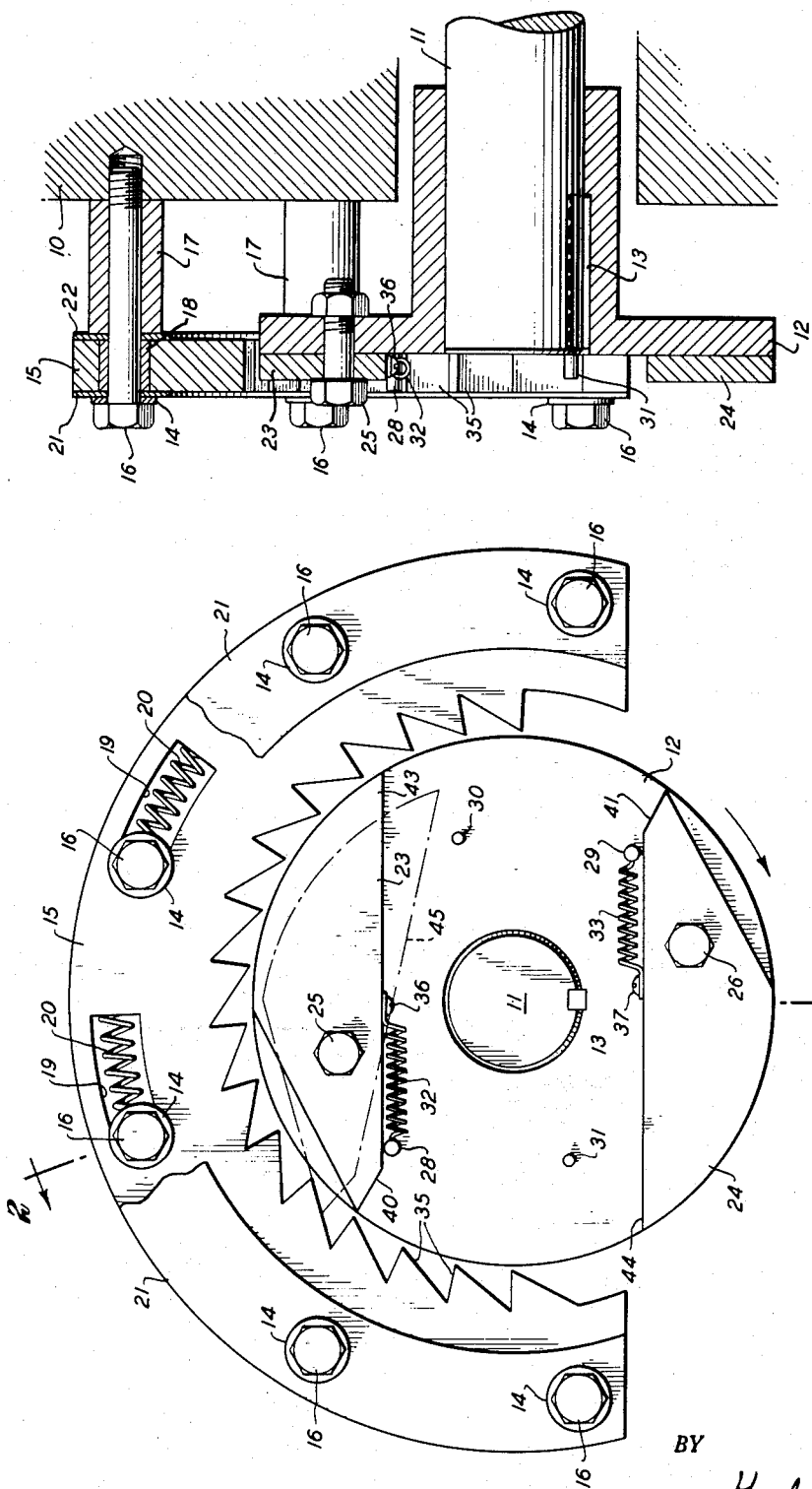
INVENTOR.
W. J. TURNER
J. C. COLE
BY
Hudson & Young
ATTORNEYS United States Patent Office 2,750,007
Patented June 12, 1956

2,750,007

REVERSE ROTATION ARRESTOR

Will J. Turner and John C. Cole, Oklahoma City, Okla., assignors to Phillips Petroleum Company, a corporation of Delaware Application October 9, 1952, Serial No. 313,828

5 Claims. (Cl. 188—82.77)

This invention relates to apparatus to prevent rotation of a body in a direction opposite to its normal direction of rotation. In another aspect it relates to mechanism to prevent backward rotation of the drive shaft of an engine.

In the operation of various types of engines it is often essential to prevent backward rotation of the drive shaft. One particular situation wherein such reverse rotation must be prevented is encountered in driving pumps by internal combustion engines. Should the check valve in the flow line downstream from the pump fail to function properly liquid may flow backward against the impeller blades to force the drive shaft to rotate in a backward direction. This can result in serious damage to the crank shaft, rod bearings, and main bearings of the engine in a matter of minutes due to the lack of lubricant which normally is circulated when the engine is rotated in its forward direction. In order to avoid such backward rotation it is necessary that the drive shaft be engaged and held securely by a brake device whenever a reverse force is applied. Moreover, such a device should remain completely inoperative during forward rotation so as not to exert frictional forces on the drive shaft.

In accordance with this invention a ratchet-type rotation arrestor is provided which fully meets the foregoing requirements. A pair of rotatable pawls are secured to the rotating body in a manner so as normally to remain out of contact with a toothed stop plate disposed adjacent the rotating body. Whenever a force is applied to the body which tends to cause backward rotation the pawls swing into engagement with the toothed stop plate to prevent such backward rotation. The stop plate is resiliently mounted adjacent the pawls in a manner so as to absorb any backward force which may be applied in a sudden manner.

Accordingly, it is an object of this invention to provide a non-reversing stop or brake device which, while permitting free rotation of a body in one direction, will automatically prevent such rotation in the opposite direction.

Another object is to provide an improved ratchet-type unidirectional rotation arrestor.

A further object is to provide a brake device which is capable of absorbing and overcoming sudden forces tending to cause rotation of a body in a direction opposite to its normal direction of rotation.

A further object is to provide a non-reversing automatic stop device of simple, durable construction, which is positive in operation, and which provides a maximum amount of safety.

Various other objects, advantages and features of this invention should become apparent from the following detailed description of a preferred embodiment thereof taken in conjunction with the accompanying drawing in which:

Figure 1 is an end view of a rotatable shaft having the reverse rotation arrestor of this invention connected thereto; and Figure 2 is a view, shown partially in section, taken along line 2—2 in Figure 1.

Referring now to the drawing in detail there is illustrated a portion of an engine housing 10 which has a drive shaft 11 extending therefrom. A flanged hub member 12 is journaled about the end of shaft 11 and secured thereto by a key 13. A semi-circular stop plate 15 is disposed about hub 12 and fastened to housing 10 in spaced relation therewith by a plurality of bolts 16 extending through tubular spacers 17. The inner edge of plate 15 is provided with a series of teeth 35. Each of the bolts 16 is provided with a washer 14 and with a bushing 18 which fits into one end of a respective elongated slot 19 formed in plate 15. A compression spring 20 is mounted within each of the slots 19 to retain stop plate 15 such that bolts 16 normally rest against corresponding edges of their respective slots 19. A cover plate 21 is mounted on the outside of stop plate 15 and a cover plate 22 is mounted on the inside of stop plate 15; both are held in place by bolts 16. A pair of pawls 23 and 24 is rotatably mounted on the face of hub 12 by respective shear bolts 25 and 26. A first pair of rods 28 and 29 are pinned to the outer surface of hub 12 to form stops against which the inner edges of respective pawls 23 and 24 rest during forward rotation of shaft 11 in a clockwise direction, see Figure 1, and a second pair of rods 30 and 31 is pinned to the outer surface of the hub 12 to form stops against which the inner edges of respective pawls 23 and 24 rest whenever there is a force applied to shaft 11 which tends to cause rotation in a counter-clockwise direction. A tension spring 32 is attached to one end of pawl 23 by a screw 36 and at the other end to rod 28, and a tension spring 33 is attached at one end to pawl 24 by a screw 37 and at the other end to rod 29.

The operation of the reverse rotation arrestor of this invention should now become apparent. From an inspection of Figure 1 it can be seen that pawls 23 and 24 are pivotally secured by bolts 25 and 26 at points rearward of their respective centers of gravity. As long as shaft 11 remains stationary the rear ends 40 and 41 of respective pawls 23 and 24 are held in engagement with the inward facing teeth 35 of stop plate 15 by springs 32 and 33. In this position the inner edges of pawls 23 and 24 rest against respective stops 30 and 31. However, when shaft 11 rotates at sufficient speed in a clockwise direction, centrifugal force moves the forward ends 43 and 44 of respective pawls 23 and 24 outwardly, thereby overcoming the restraining forces of springs 32 and 33 so as to rotate the rear ends 40 and 41 of the pawls inwardly completely out of contact with the teeth 35 of stop plate 15. Stops 28 and 29 limit this rotation at a position where the rear ends 40 and 41 of the pawls are completely out of contact with teeth 35. This prevents wear on the pawls and teeth and the unpleasant noise which normally would accompany such a riding of the pawls on the teeth of the stop plate. Thus, as long as rotation continues at a predetermined speed in a clockwise direction the pawls are held out of contact with the stop plate. Once the speed of rotation falls below a predetermined rate springs 32 and 33 force the pawls into contact with the stop plate teeth to prevent rotation from taking place in a counter-clockwise direction. This latter position of pawl 23 is illustrated by the broken line 45 in Figure 1. The initial impact of pawls 23 and 24 striking stop plate 15 is cushioned by compression springs 20 which resiliently mount plate 15 on engine housing 10.

From the foregoing description it can be seen that there is provided in accordance with this invention an improved reverse rotation arrestor which assures positive engagement with a rotating body to prevent backward rotation. The stop member is resiliently mounted to cushion the initial impact created by the body attempting to reverse its direction of rotation. The shear bolts which pivotally mount the pawls are employed such that breakage will take place at the bolts should an excessive force be applied to cause backward rotation. In the previously mentioned application to an internal combustion engine driving a liquid pump it has been found that an occasional backfiring of the engine results in a backward force of such magnitude that it is not possible to prevent reverse rotation even with an arrestor. With the stop device of this invention, breakage takes place at the shear bolts which allows the pawls to fall clear from the shaft thereby avoiding the hazardous condition which could result should breakage take place at some other point. The use of the half circle stop plate enables the pawls to fall clear in this manner. By providing a pair of pawls positive engagement with the stop plate is assured at any given position.

While this invention has been described in conjunction with a particular application to the drive shaft of an internal combustion engine it should be apparent that the arrestor is applicable wherever it is desired to prevent backward or reverse rotation of a rotatable body by means of an automatic device which allows free rotation in one direction, but which prevents rotation in the opposite direction.

What is claimed is:

1. A reverse direction arrestor comprising, in combination, a hub member adapted to be secured to a rotatable body, a pair of pawls pivotally attached to said hub member on opposite sides of the face thereof, said pawls being mounted at pivot points forward of their centers of gravity whereby the rearward ends thereof are rotated outwardly by centrifugal force when said hub member is rotated, a semi-circular stop plate having inwardly facing teeth disposed adjacent said hub member whereby said pawls can engage said teeth, means attaching said stop plate resiliently to a body fixed with respect to said hub member to cushion the impact of said pawls against the teeth of said stop plate, a first stop member fixed with respect to each of said pawls to prevent outward rotation of the rearward ends thereof into engagement with said teeth during forward rotation of said hub member, a second stop member fixed with respect to each of said pawls to align the forward ends of said pawls in engagement with said teeth in the absence of forward rotation of said hub member, and tension means to retain said pawls in said last mentioned position until overcome by said centrifugal force.

2. A reverse direction arrestor comprising, in combination, a hub member adapted to be secured to a rotatable body, a pair of pawls pivotally attached to said hub member on opposite sides of the face thereof, said pawls being mounted by shear bolts at pivot points forward of their centers of gravity whereby the rearward ends thereof are rotated outwardly by centrifugal force when said hub member is rotated, a semi-circular stop plate having inwardly facing teeth disposed adjacent said hub member whereby said pawls can engage said teeth, means attaching said stop plate resiliently to a body fixed with respect to said hub member to cushion the impact of said pawls against the teeth of said stop plate, a first stop member mounted on said face of said hub member adjacent each of said pawls to prevent outward rotation of the rearward ends thereof into engagement with said teeth during forward rotation of said hub member, a second stop member mounted on said face of said hub member adjacent each of said pawls to align the forward ends of said pawls in engagement with said teeth in the absence of forward rotation of said hub member, and tension springs interconnected between each of said pawls and associated said first stop members to retain said pawls in said last mentioned position until overcome by said centirfugal force.

3. A reverse direction arrestor comprising, in combination, a hub member adapted to be secured to a rotatable body, a pair of pawls pivotally attached to said hub member on opposite sides of the face thereof, said pawls being mounted at pivot points forward of their centers of gravity whereby the rearward ends thereof are rotated outwardly by centrifugal force when said hub member is rotated, a semi-circular stop plate having inwardly facing teeth disposed adjacent said hub member whereby said pawls can engage said teeth, said stop plate being resiliently attached to a body fixed with respect to said hub member by a plurality of rigid members extending through respective elongated slots formed in said stop plate, said slots containing compression members to retain said rigid members against corresponding ends of said slots until overcome by the forces exerted by said pawls engaging said teeth, a first stop member fixed with respect to each of said pawls to prevent outward rotation of the rearward ends thereof into engagement with said teeth during forward rotation of said hub member, a second stop member fixed with respect to each of said pawls to align the forward ends of said pawls in engagement with said teeth in the absence of forward rotation of said hub member, and tension means to retain said pawls in said last mentioned position until overcome by said centrifugal force.

4. Apparatus to prevent backward rotation of the drive shaft of an engine comprising, in combination, a hub member secured to the drive shaft of the engine, a pair of pawls pivotally attached to said hub member on opposite sides of the face thereof, said pawls being mounted at pivot points forward of their centers of gravity whereby the rearward ends thereof are rotated outwardly by centrifugal force when said hub member is rotated, a semi-circular stop plate having inwardly facing teeth disposed adjacent said hub member whereby said pawls can engage said teeth, said stop plate being resiliently attached to the housing of the engine by a plurality of bolts extending through respective elongated slots formed in said stop plate, said slots containing compression members to retain said bolts against corresponding ends of said slots until overcome by the forces exerted by said pawls engaging said teeth, a first stop member fixed with respect to each of said pawls to prevent outward rotation of the rearward ends thereof into engagement with said teeth during forward rotation of said hub member, a second stop member fixed with respect to each of said pawls to align the forward ends of said pawls in engagement with said teeth in the absence of forward rotation of said hub member, and tension means to retain said pawls in said last mentioned position until overcome by said centrifugal force.

5. A reverse direction arrestor comprising a hub member adapted to be secured to a rotatable body, a pawl pivotally attached to the face of said hub member, said pawl being mounted at a pivot point forward of its center of gravity so that the rearward end thereof is rotated outwardly by centrifugal force when said hub member is rotated, a generally semi-circular stop plate having inwardly facing teeth disposed adjacent said hub member so that said pawl can engage said teeth, means attaching said plate resiliently to a body fixed with respect to said hub member to cushion the impact of said pawl against the teeth of said stop plate, a first stop member fixed with respect to said pawl to prevent outward rotation of the rearward end thereof into engagement with said teeth during forward rotation of said hub member, a second stop member fixed with respect to said pawl to align the forward end thereof in engagement with said teeth in the absence of forward rotation of said hub member, and tension means tending to retain said pawl in said last-mentioned position until overcome by said centrifugal force.

References Cited in the file of this patent

UNITED STATES PATENTS

| | | |
|---|---|---|
| 875,336 | Evans | Dec. 31, 1907 |
| 1,933,742 | Lietz | Nov. 7, 1933 |
| 2,166,792 | Black | July 18, 1939 |